(12) United States Patent
Baeuerle

(10) Patent No.: US 9,810,222 B2
(45) Date of Patent: Nov. 7, 2017

(54) FLUID PUMP COMPRISING A POSITIVE-LOCKING CLUTCH FOR A MOTOR VEHICLE

(71) Applicant: Robert Bosch GmbH, Stuttgart (DE)

(72) Inventor: Michael Baeuerle, Eberdingen (DE)

(73) Assignee: Robert Bosch GmbH, Stuttgart (DE)

(*) Notice: Subject to any disclaimer, the term of this patent is extended or adjusted under 35 U.S.C. 154(b) by 598 days.

(21) Appl. No.: 14/453,402

(22) Filed: Aug. 6, 2014

(65) Prior Publication Data

US 2015/0044074 A1 Feb. 12, 2015

(30) Foreign Application Priority Data

Aug. 6, 2013 (DE) .................. 10 2013 215 424

(51) Int. Cl.
| | | |
|---|---|---|
| F01P 3/00 | (2006.01) | |
| F04D 13/02 | (2006.01) | |
| F16D 11/14 | (2006.01) | |
| F16D 23/00 | (2006.01) | |
| F16D 11/04 | (2006.01) | |
| F04C 15/00 | (2006.01) | |

(52) U.S. Cl.
CPC .............. *F04D 13/022* (2013.01); *F01P 3/00* (2013.01); *F04D 13/021* (2013.01); *F16D 11/04* (2013.01); *F16D 11/14* (2013.01); *F16D 23/00* (2013.01); *F04C 15/0073* (2013.01)

(58) Field of Classification Search
CPC ...... F04D 13/021; F04D 13/022; F16D 11/04; F16D 2121/22; F16D 59/02; F16D 11/14; F16D 23/12; F16D 25/061; F16D 48/06; B60K 6/383; B60K 6/48; B60Y 2400/427; F04C 15/0073
USPC ................................................ 192/43.2, 53.5
See application file for complete search history.

(56) References Cited

U.S. PATENT DOCUMENTS

| | | | |
|---|---|---|---|
| 4,269,293 A | 5/1981 | Martin | |
| 2010/0006387 A1* | 1/2010 | Lee ........................ | B62D 5/063 192/69.82 |
| 2010/0108458 A1* | 5/2010 | Harris ..................... | F16D 23/12 192/69 |

FOREIGN PATENT DOCUMENTS

| | | | |
|---|---|---|---|
| DE | 3605953 | 8/1987 | |
| DE | 3605953 A1 * | 8/1987 | ............. F16D 11/14 |
| DE | 10126485 | 12/2002 | |
| JP | 2000227128 | 8/2000 | |
| JP | 2000227153 | 8/2000 | |

* cited by examiner

*Primary Examiner* — Dominick L Plakkoottam
(74) *Attorney, Agent, or Firm* — Michael Best & Friedrich LLP

(57) ABSTRACT

A fluid pump (10) for a motor vehicle comprising a pump rotor (20) for pumping a fluid, a shaft (12) for driving the pump rotor (20) and a clutch (16) for the switchable coupling of the shaft (12) to the pump rotor (20). The clutch (16) is designed to connect the shaft (12) to the pump rotor (20) in a positive-locking manner and to separate said shaft from said pump rotor.

17 Claims, 2 Drawing Sheets

FLUID PUMP COMPRISING A POSITIVE-LOCKING CLUTCH FOR A MOTOR VEHICLE

BACKGROUND OF THE INVENTION

The invention relates to a fluid pump for a motor vehicle, for example a water pump for circulating coolant.

Water pumps for circulating the coolant of the engine are used in motor vehicles. The shaft of such a water pump, to which the pump rotor is fastened, is generally connected to the engine via a toothed belt or V-ribbed belt; thus enabling coolant to be pumped at the same time that the engine is operating.

The circulation of the coolant can be optimized with a switchable water pump, i.e. a water pump in which the pump output can be adjusted. On the one hand, the heat-up behavior of the engine can, for example, be accelerated by means of a deactivated or stationary water pump in the warm-up phase of the engine; and on the other hand, the power dissipation of the water pump can be reduced.

An electromagnetic clutch can, for example, be used for connecting and separating the pump shaft from the pump rotor. In so doing, churning losses due to decoupling can be prevented; however, relatively high magnetic forces are normally required in order to be able to ensure the frictional connection of the clutch in all circumstances, which can lead to a large use of and expenditure for copper.

In addition, there are water pumps comprising a switchable friction wheel clutch comprising a switchable intermediate wheel, in which the length of the tensioning arm can be electrically adjusted by means of an eccentric. Due to environmental influences on the engine, a frictionally engaged transmission is however not very robust.

A hydraulically actuated control gate valve is also used to close the outlet region of the pump rotor and thereby deactivate the pump. In so doing, the rotor continues to rotate at an unchanged rotational speed and generates churning losses in the coolant.

A further switching principle is based on a pump rotor comprising guide vanes that can be rotated coaxially to the rotor inlet, which, however, again leads to churning losses.

SUMMARY OF THE INVENTION

It is the aim of the invention to provide a switchable fluid pump for a motor vehicle, said pump being simply constructed, cost-effective and efficient with minimal losses.

The invention relates to a fluid pump for a motor vehicle. The fluid pump can be a pump for coolant, more or less cooling water, which, for example, is used to cool the drive train of the vehicle. The vehicle can be a street vehicle, for example a passenger car, truck or bus.

According to one embodiment of the invention, the fluid pump comprises a pump rotor for pumping a fluid, a shaft for driving the pump rotor and a clutch for the switchable coupling of the shaft to the pump rotor. The clutch is designed to connect the shaft to the pump rotor in a positive-locking manner or to separate the shaft from the pump rotor. In other words, a first coupling element of the clutch (for example on the shaft) can engage in a positive-locking manner with a further second coupling element (for example on the rotor) in order to transmit a rotational movement of the shaft to the rotor. The first coupling element can be moved away from the second coupling element in order to decouple the shaft from the rotor so that the fluid pump can no longer deliver fluid even if the shaft rotates. In this way an actuable, mechanical decoupling of the pump rotor from the drive of the shaft is achieved without churning losses occurring and without large actuating forces being required.

The shaft can be a primary shaft which can be connected to a drive, for example the engine of the motor vehicle that also drives said motor vehicle. The fluid pump can further comprise a secondary shaft which is connected to the pump rotor and can be coupled to the primary shaft by means of the clutch.

According to one embodiment of the invention, the clutch is a dog clutch. A switchable dog clutch can, for example, be integrated into the shaft between the drive and the pump rotor. The first and the second clutch element can have in each case an axial tooth system which systems mesh with each other when the clutch is engaged.

According to one embodiment of the invention, the clutch comprises a (first) coupling element which can be axially displaced with respect to the shaft and is designed to engage with a further (second) coupling element. The first coupling element can be connected to the primary shaft and the second coupling element to the pump rotor (for example as part of the secondary shaft).

In particular, a part of the dog clutch can be axially displaceable so that the positive-locking connection can be interrupted or established.

According to one embodiment of the invention, the axially displaceable coupling element and the further coupling element are designed to mesh with one another via a tooth system comprising teeth protruding in the axial direction.

According to one embodiment of the invention, the further coupling element is connected to the pump rotor, for example, via the secondary shaft.

According to one embodiment of the invention, the axially displaceable coupling element is displaceably fastened via a radial tooth system to the shaft in the axial direction. The axial direction can be defined via the axis of the shaft and/or the axis of the pump rotor.

According to one embodiment of the invention, the clutch comprises a return spring which presses the axially displaceable coupling element in the direction of the further coupling element. The return spring can be, for example, a coil spring and/or surround the shaft. The return spring ensures that the clutch is closed even if a possible actuator of the fluid pump malfunctions.

According to one embodiment of the invention, the axially displaceable coupling element comprises a helical groove in which a pin can engage in the radial direction in order to move the axially displaceable coupling element away from the further coupling element when said former coupling element is rotated about the axis thereof or, respectively, about the axial direction. The helical groove can thereby run obliquely to a circumferential direction around the shaft.

The displaceable part of the clutch, i.e. the axially displaceable coupling element, bears a helical groove on the lateral surface. In order to open the clutch, a pin is moved approximately in the radial direction into the helical groove, said pin latching into the groove. The displaceable coupling element rotates with the shaft, and the pin in the helical groove presses the displaceable coupling element away from the further coupling element. As a result, the positive-locking connection is interrupted and the pump rotor is stationary even if the primary shaft continues to rotate.

According to one embodiment of the invention, the axially displaceable coupling element comprises an annular groove, in which the pin is guided after leaving the helical groove. The annular groove can thereby run (circularly) around the shaft. After the displaceable coupling element has been moved away from the further coupling element, the former reaches an end position, in which the pin slides into the annular groove and holds said displaceable coupling element in the end position.

According to one embodiment of the invention, the annular groove is radially deeper than the helical groove. The pin can therefore fall in the end position into the annular groove. In this way, a rattling of the pin at the end of the helical groove can be prevented if said end continually moves past the pin due to the continuous rotation of the shaft.

According to one embodiment of the invention, the fluid pump further comprises an (for example electromagnetic) actuator which is designed upon activation to move the pin into the helical groove. By passing current through the actuator, the guide pin can radially latch into the helical groove, whereby an axial displacement of the displaceable coupling element can be generated when the shaft rotates. Because an electromagnetic actuator has only to generate very small forces, said actuator can be of very small and cost effective design.

According to one embodiment of the invention, the actuator comprises a return spring, which is designed to move the pin away from the radially displaceable coupling element when the actuator is deactivated. If the actuator is deactivated, the guide pin is retracted by means of a return spring, whereby the clutch can be displaced axially back into frictional connection by means of a second return spring, and the pump rotor rotates again.

According to one embodiment of the invention, the fluid pump further comprises a belt pulley that is connected to the shaft for a drive belt driven by the engine of the vehicle. By way of example, the drive belt can be a toothed belt on the engine with which the fluid pump is driven when the engine rotates.

BRIEF DESCRIPTION OF THE DRAWINGS

Embodiments of the invention are described below in detail with reference to the attached drawings.

In principle, identical or similar parts are provided with the same reference signs.

DETAILED DESCRIPTION

Figure 1:
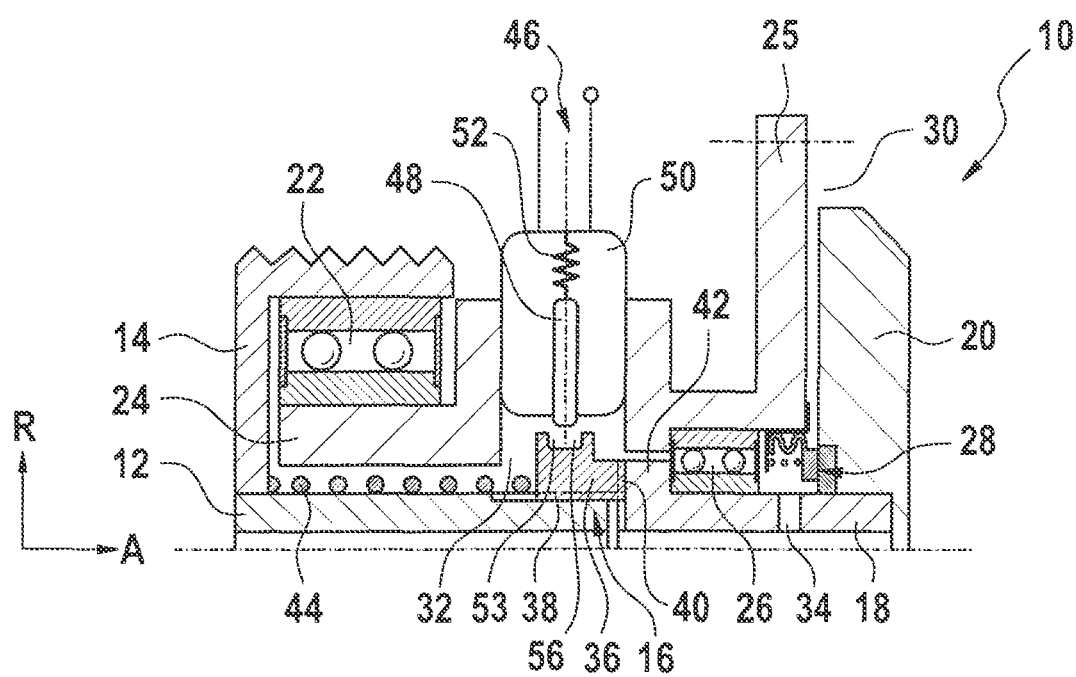
FIG. 1 shows a schematic longitudinal cross-section through a fluid pump according to one embodiment of the invention.

FIG. 1 shows a fluid pump 10 that is schematically depicted in longitudinal cross-section. The fluid pump 10, which can, for example, be used to pump coolant for a combustion engine of electric motor of a vehicle, comprises a primary shaft 12, which can be driven via a belt pulley 14. The primary shaft 12 is connected via a dog clutch 16 to a secondary shaft 18 to which the pump rotor 20 is fastened.

The belt pulley 14 is mounted by means of a bearing 22 on an outer face of a housing 24 comprising a flange 25, said outer face therefore also indirectly supporting the primary shaft 12. The secondary shaft 18 and therefore the rotor 20 are mounted via a bearing 26 on an inner face of the housing 24. A face seal 28 is located between the bearing 26 and the rotor, said face seal separating the pump chamber 30 from the space 32 in the housing 24 in which the shafts 12, 18 and the clutch 16 are accommodated.

The primary shaft 12 and the secondary shaft 18 can be embodied as hollow shafts, wherein a leak bore 34 can be provided in the secondary shaft 18 for draining off leakage from the space 32.

The clutch 16 comprises a coupling element 36 which is displaceable in the axial direction A on the primary shaft 12 and is entrained by the primary shaft 12 via a radial toothed driving section 38 (comprising teeth which protrude from the primary shaft in the radial direction R). The coupling element 36 can engage via an axial toothed section 40 (having teeth that protrude in the axial direction) with a further coupling element 42 which is formed at one end of the secondary shaft 18.

In FIG. 1, the clutch 16 is shown in a closed position. A return spring 44 presses the coupling element 36 against the coupling element 42, and the primary shaft 12 can drive the pump rotor 20. The return spring 44 is embodied as a coil spring which surrounds the primary shaft 12 and is supported at one end on the housing 24 and at the other end on the coupling element 36.

The clutch 16 can be opened with an actuator 46 which comprises a pin 48 that can be moved by an electromagnet 50 in the radial direction R inwardly against the coupling element 36. If the electromagnet 50 is not energized, a return spring 52 moves the pin 48 away from the coupling element 36.

Figure 2:
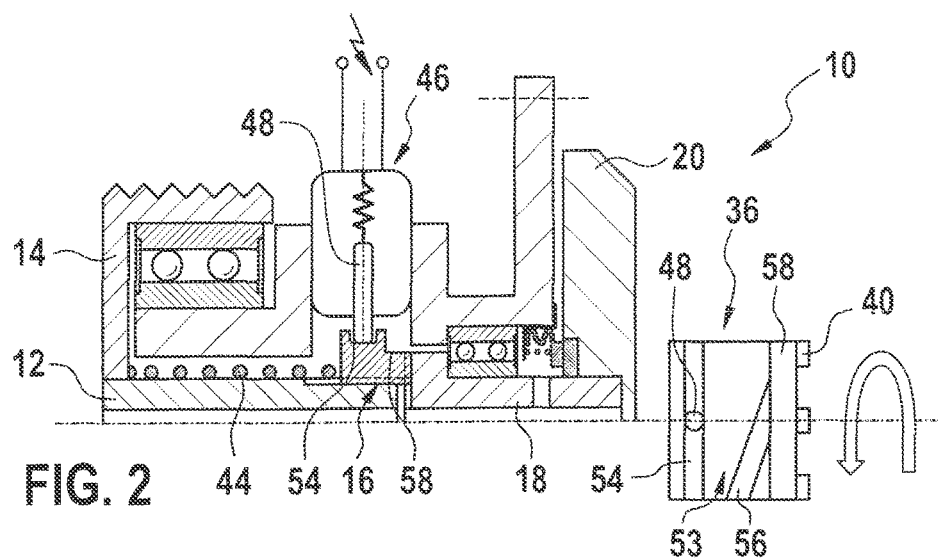
FIG. 2 shows a schematic longitudinal cross-section through the fluid pump from FIG. 1 when opening the clutch in a first position.

As is apparent in FIG. 2, the coupling element has a guide groove 53 for the tip of the pin 48, which will be described in more detail in reference to FIGS. 3 to 5. In FIG. 2, the fluid pump 10 or, respectively, the clutch 16 is shown in a position which results shortly after the actuator has been energized, i.e. at the beginning of the disengagement phase.

A top view of the coupling element 36 in the radial direction R is depicted next to the longitudinal cross-section through the fluid pump 10. It can be seen here that the guide groove 53 comprises a collecting groove segment 54, a helical groove segment 56 and a base circle segment or annular groove segment 58.

After the pin 48 has moved towards the coupling element 36, the tip thereof engages in the collecting groove segment 54. In so doing, the coupling element 36 rotates through the rotation of the primary shaft 12 about the axis A, and the pin 48 slides in the collecting groove segment 54 and is guided by the same into the helical groove segment 56.

Figure 3:
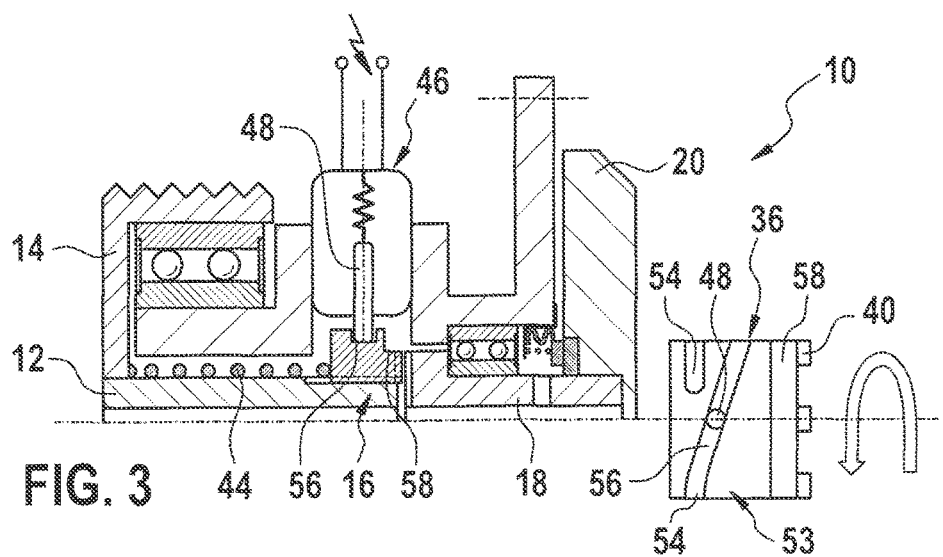
FIG. 3 shows a schematic longitudinal section through the fluid pump from FIG. 1 when opening the clutch in a second position.

It can be seen in FIG. 3 that the collecting groove segment 54 does not extend around the entire coupling element 36 but only around a portion of the circumference. The collecting groove segment 54 opens into the helical groove segment 56, the transition between the two segments 54, 56 being curved in order to allow the pin 48 to slide from the collecting groove segment 54 into the helical groove segment 56 in a low-wear and low-noise manner.

FIG. 3 shows a partial stroke of the coupling element 36 while the clutch releases. The coupling element 36 is moved away from the coupling element 42 in the axial direction A by means of the movement of the pin 48 in the helical groove segment 56. The positive-locking connection of the tooth system 40 is released and the secondary shaft 18 or, respectively, the pump rotor 20 is decoupled from the primary shaft 12.

Figure 4:
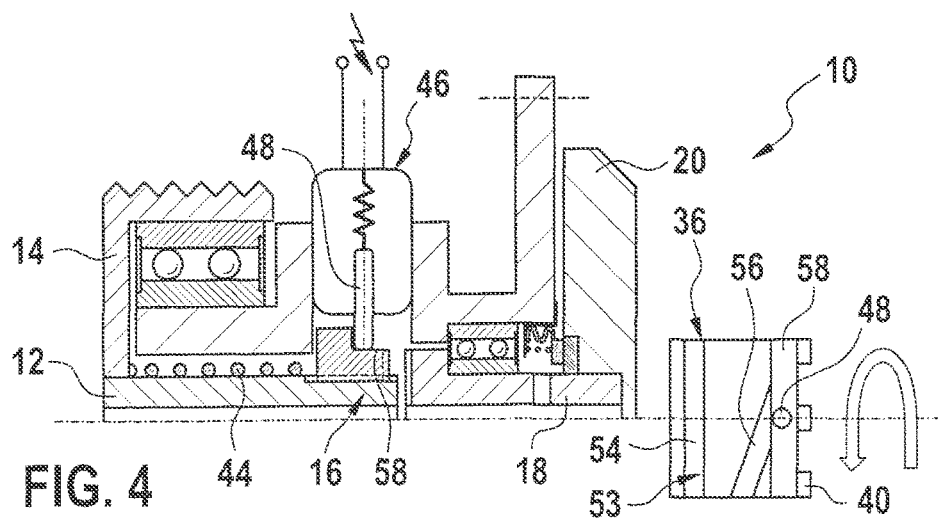
FIG. 4 shows a schematic longitudinal cross-section through the fluid pump from FIG. 1 when opening the clutch in a third position.

FIG. 4 shows a full stroke of the coupling element 36. The clutch 16 is completely released. At the end of the axial movement of the coupling element 36, the pin 48 or more precisely the tip thereof slides out of the helical groove segment 56 into the base circle segment or, respectively, annular groove segment 58. The end of the disengagement phase is achieved. As long as current passes through the actuator 46, the pin 48 remains in the annular segment 58 and the clutch remains disengaged.

Because the annular segment 58 is deeper in the radial direction R than the helical groove segment 56, a rattling at the outlet of the helical groove does not occur when said outlet periodically moves past the pin 48.

If current is no longer passed through the actuator, the pin 48 is lifted by the return spring 52 out of the annular groove segment 58 and the pin 48 no longer prevents the return spring 44 from moving the coupling element 36 towards the coupling element 42 until the closed position of the clutch 16 shown in FIG. 1 is achieved.

In addition, it should be noted that "comprising" does not exclude other elements or steps, and "one" or "a" does not exclude a plurality. It should further be noted that features or steps, which are described with reference to one of the exemplary embodiments above, can also be used in combination with other features or steps of other exemplary embodiments described above. Reference signs in the claims are not to be regarded as limiting factors.

What is claimed is:

1. A fluid pump (10) for a motor vehicle, the fluid pump comprising:
    a pump rotor (20) for pumping a fluid;
    a shaft (12) for driving the pump rotor (20);
    a clutch (16) for the switchable coupling of the shaft (12) to the pump rotor (20);
    characterized in that the clutch (16) is operable to connect the shaft (12) to the pump rotor (20) in a positive-locking manner and to separate the shaft (12) from the pump rotor (20),
    wherein the clutch (16) comprises a coupling element (36) which is axially displaceable with respect to the shaft (12) and is operable to come in engagement with a further coupling element (42), and
    wherein the axially displaceable coupling element (36) comprises a helical groove (56), in which a pin (48) can be latched in a radial direction in order to move the axially displaceable coupling element (36), when rotated, away from the further coupling element (42).

2. The fluid pump (10) according to claim 1, wherein the clutch (16) is a dog clutch.

3. The fluid pump (10) according to claim 1, wherein the axially displaceable coupling element (36) and the further coupling element (42) are operable to mesh via a toothed section (40) with teeth protruding in an axial direction (A).

4. The fluid pump (10) according to claim 1, wherein the further coupling element (42) is connected to the pump rotor (20).

5. The fluid pump (10) according to claim 1, wherein the axially displaceable coupling element (36) is fastened via a radial toothed section (38) to the shaft (12) so as to be displaceable in an axial direction (A).

6. The fluid pump (10) according to claim 1, wherein the clutch (16) comprises a return spring (44) which presses the axially displaceable coupling element (36) towards the further coupling element (42).

7. The fluid pump (10) according to claim 1, wherein the axially displaceable coupling element (36) comprises an annular groove (58), in which the pin (48) is guided after leaving the helical groove (56).

8. The fluid pump (10) according to claim 7, wherein the annular groove (58) is radially deeper than the helical groove (56).

9. The fluid pump (10) according to claim 1, further comprising an actuator (46), which is operable, when activated, to move the pin (48) into the helical groove (56), wherein the actuator (46) comprises a return spring (52) which is operable to move the pin (48) away from the radially displaceable coupling element (36) when the actuator (46) is deactivated.

10. The fluid pump (10) according to claim 1, further comprising a belt pulley (22) connected to the shaft (12) for a drive belt that can be driven by an engine of the vehicle.

11. The fluid pump (10) according to claim 2, wherein the axially displaceable coupling element (36) and the further coupling element (42) are operable to mesh via a toothed section (40) with teeth protruding in an axial direction (A).

12. The fluid pump (10) according to claim 11, wherein the further coupling element (42) is connected to the pump rotor (20).

13. The fluid pump (10) according to claim 12, wherein the axially displaceable coupling element (36) is fastened via a radial toothed section (38) to the shaft (12) so as to be displaceable in an axial direction (A).

14. The fluid pump (10) according to claim 13, wherein the clutch (16) comprises a return spring (44) which presses the axially displaceable coupling element (36) towards the further coupling element (42).

15. The fluid pump (10) according to claim 14, wherein the axially displaceable coupling element (36) comprises an annular groove (58), in which the pin (48) is guided after leaving the helical groove (56).

16. The fluid pump (10) according to claim 15, wherein the annular groove (58) is radially deeper than the helical groove (56).

17. The fluid pump (10) according to claim 16, further comprising an actuator (46), which is operable, when activated, to move the pin (48) into the helical groove (56), wherein the actuator (46) comprises a return spring (52) which is operable to move the pin (48) away from the radially displaceable coupling element (36) when the actuator (46) is deactivated.

* * * * *